UNITED STATES PATENT OFFICE.

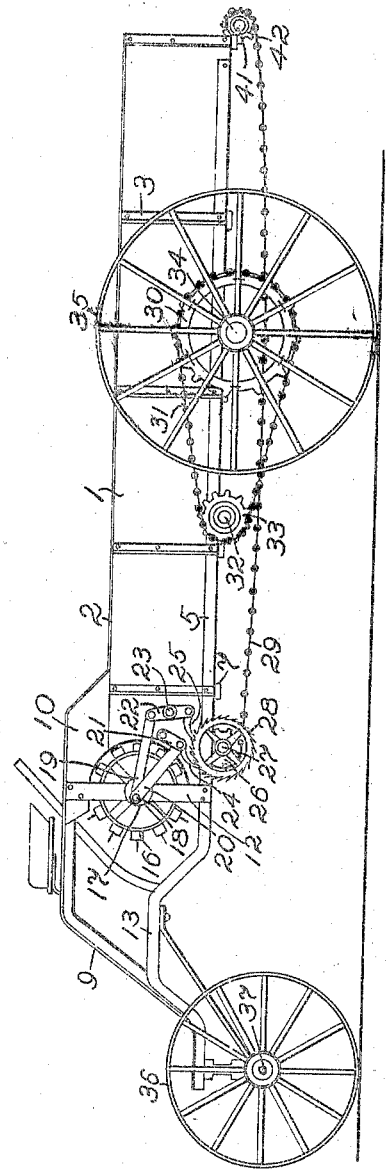

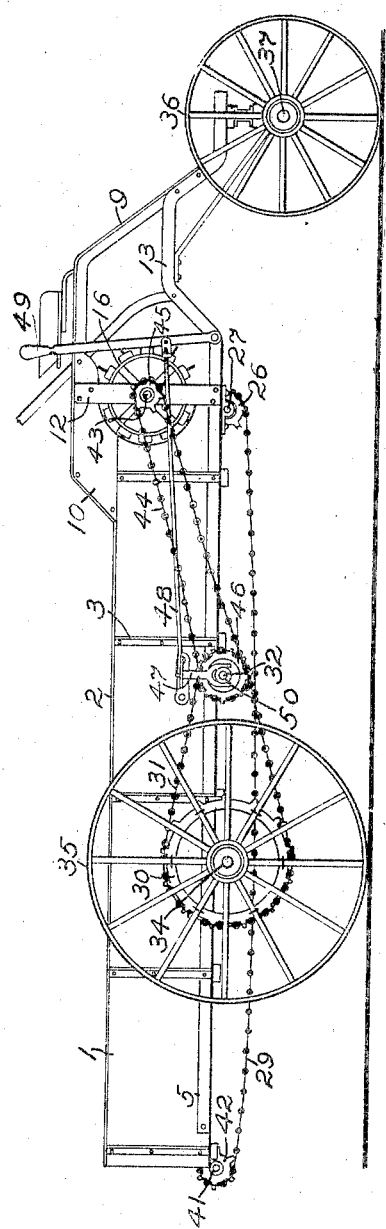

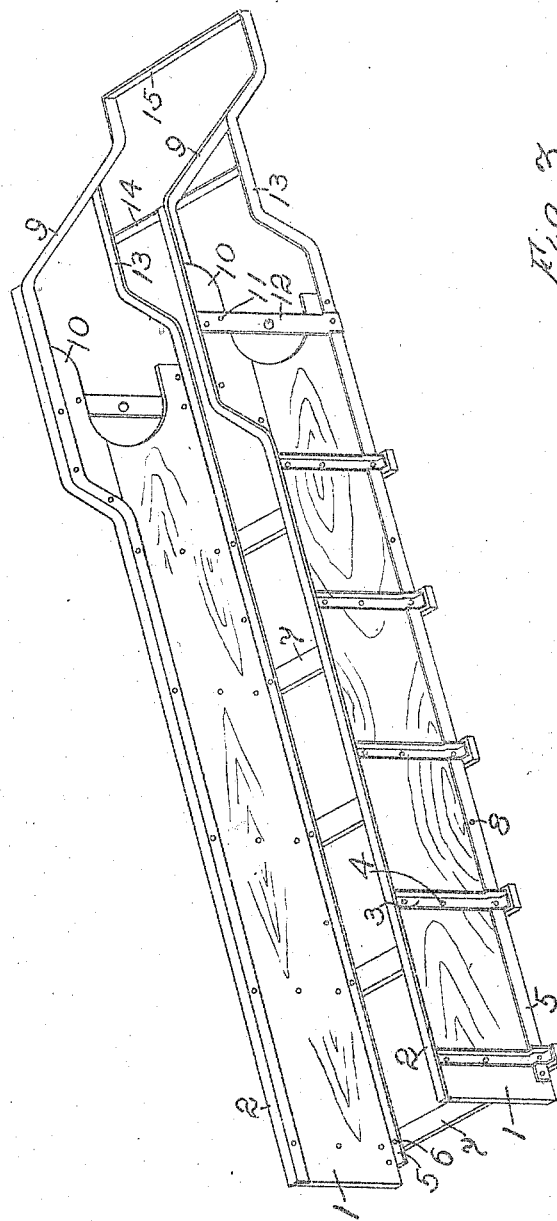

EUGENE BUSWELL AND THOMAS CASCADEN, JR., OF WATERLOO, IOWA; SAID BUSWELL ASSIGNOR TO SAID CASCADEN.

FERTILIZER-DISTRIBUTER.

No. 928,026.   Specification of Letters Patent.   Patented July 13, 1909.

Application filed September 26, 1908.  Serial No. 454,883.

*To all whom it may concern:*

Be it known that we, EUGENE BUSWELL and THOMAS CASCADEN, Jr., citizens of the United States of America, and residents of Waterloo, Blackhawk county, Iowa, have invented certain new and useful Improvements in Fertilizer-Distributers, of which the following is a specification.

Our invention relates to improvements in fertilizer distributers, and the object of our improvement is to provide a removable transferable spreader-box for use with standard width wagon running-gear, such spreader-box being so constructed as to be of great strength and lightness while at the same time affording a maximum width of interspace between its sides, such space being wide enough to permit the delivery of fertilizer therefrom to cover two rows of corn which are spaced apart the standard distance in drilling. This object we have accomplished by the means which are hereinafter fully described and claimed, and which are illustrated in the accompanying drawings, in which:

Figure 1 is a left-side elevation of a fertilizer distributer equipped with one of our improved spreader-boxes. Fig. 2 is a right-side elevation of the same. Fig. 3 is a perspective of our said improved spreader-box, taken without the spreader-mechanism.

Similar numbers refer to similar parts throughout the several views.

Our improved spreader-box 1 is shown as being mounted on front- and rear-carrying-wheels 36 and 35 respectively. As shown, the spreader-box is equipped with a conveyer-apron 29 movable through it, and with a distributing-drum 16 mounted on a rotatable shaft 43 at its forward end, said drum being adapted to deliver fertilizer materials through the frame of the wagon just to the rear of said front-carrying-wheels 36. Said drum is driven by the following described mechanism. Driving sprocket-rims 30 are secured to the inner faces of the spokes of the rear-carrying-wheels 35 in the usual manner and drive the sprocket-chains 31. A transverse rotatable shaft 32 has its ends supported in depending bearings (not shown) on the bottom of the box 1. Each end of said shaft carries a driven-sprocket 33 which is driven by the chain 31 on the same side of said box. Another sprocket-wheel 46 is mounted slidably and rotatably on the right-hand end of the shaft 32, and has a ratcheted hub adapted to be slid into engagement with the ratcheted hub of the adjacent wheel 33, when the hand-lever 49 is shifted to move the fork 47 connected with first-mentioned hub in one direction, through the medium of the connecting-rod 48. A sprocket-chain 44 connects the sprocket-wheel 46 and the driven-sprocket 45 on the right-hand end of the distributing-drum shaft 43.

An endless conveyer-apron 29 moves through the spreader-box 1, and is driven by sprockets 26 mounted on a transverse rotatable shaft 27, the rear end of the sprocket-chains of said apron passing over idlers 42 on a shaft 41. The shaft 27 is driven by the following-described means. A ratchet-wheel 28 is secured to the left-hand end of said shaft. This ratchet-wheel is engaged by driving-pawls 24 and 25 pivoted to the levers 21 and 22 respectively. The rear pawl 25 is pivoted to the medially-pivoted lever 22, the pivot being a stud 23 projected from the wagon-box, and this pawl works reversely to the pawl 24 by this arrangement, so as to have the pawls work alternately in driving the ratchet-wheel. A crank-pin 18 on the left-hand end of the distributing-drum shaft is pivoted to and drives the pitmen 19 and 20, said pitmen being pivotally connected to the levers 22 and 21 respectively. We do not propose, however, to confine ourselves to the driving-mechanism shown, since any suitable means may be adopted as desired to actuate the distributing-drum 16 or the conveyer-apron 29, our invention relating specifically to the construction of the spreader-box 1 to coöperate with a removable spreader-mechanism for use with any standard set of wagon running-gear of the standard width. The driving mechanism which is illustrated and described herein, is made the subject of a separate and independent application filed in the United States Patent Office, on August 31, 1908, under Serial Number 450,975.

The spreader-box shown consists of the longitudinal wooden sides 1 which are concaved at their forward ends to afford clearance space for the ends of the distributing-drum. A spacing piece 10 is secured to the upper forward part of each of said sides, and an outwardly-flanged bar 2 is secured to the upper edge of said side and said spacing-pieces, and the forward end of each bar 2 is then bent obliquely downward at 9 and joined by a horizontal bar 15. Another bar is secured to each lower edge of each side 1, and projects forwardly therefrom, being bent upwardly to form an arch 13 under which the forward carrying wheels 36 may turn, and are then united with the bars 2. The two sides 1 are connected by a plurality of transverse sills 7 secured to the bars 5 by bolts or rivets 6, the bars 5 being secured to said sides by bolts or rivets 8. Uprights 12 are secured by means of rivets or bolts 11 to the forward end of the spreader-box, and are orificed to provide supports for the ends of the distributing-drum shaft 43. A transverse brace 14 connects the arches 13. The sides 1 are strengthened by vertical braces 3 extending from the upper to the lower bars, and secured to the sides and bars by means of bolts or rivets 4.

In the drawings the spreader-box is shown as being supported in the rear on the rear axle, the rear bolster and reach of the running-gear having been removed. This arrangement of the parts is to permit of the lowering of the spreader-box so as to reduce the lift in loading it. However, the spreader-box may be lifted upon the ordinary standard width running-gear of a wagon, after the wagon-box has been removed, and will then be supported detachably upon the bolsters in the ordinary manner, although higher from the ground than in the views here given.

Farm wagons being constructed of a standard width of tread, our improved spreader-box has been designed especially to meet this condition. The width of the standard running-gear is such that there is not room enough provided between the carrying-wheels after deducting needed space for the operative mechanism, to permit the use of a spreader-box whose width between the inner surfaces of its sides 1 is sufficient to allow of a delivery wide enough to cover with the distributed fertilizer two adjacent corn rows drilled in the standard width apart of forty-four inches. In other words, the ordinary spreader-box designed as a transferable box to be placed on any set of wagon running-gear of standard width, has a delivery-opening at the distributing-drum which is not wide enough by at least two inches to cover adjacent corn rows separated forty-four inches the standard distance for drilling apart. The result is that either one or both of the corn rows is not covered with the fertilizer and additional time must be consumed in going over the field. Our improved spreader-box obviates this disadvantage, by reason of its peculiar manner of construction as described.

The side-pieces 1 in our said box may be and are made of very thin boards, less than half the thickness of the side-boards used on the ordinary fertilizer distributer. We can use these thin boards because of our cross-bracing of the upper and lower bars by means of the uprights 3, and the securing at frequent intervals of such uprights to both the bars and side-pieces. The use of the thin sides 1 permits of a saving in combined thickness thereof amounting to two inches, just enough to make the interspace of said box clear forty-four inches and thus permit of a delivery upon corn-rows spaced that standard distance apart, which cannot be done with a thickened pair of side-pieces of the ordinary construction as used on the standard width of wagon running-gear. The bracing and strengthening of the sides as shown, further makes the box lighter, as well as more commodious for holding loads, and cheaper in construction. The use of a top bar as shown, prevents the destruction of the upper edge of the box by reason of the careless friction and dragging of shovels over it while loading.

While we have shown a special construction of the forward part of the spreader box and frame, we do not desire to be limited thereby, since our invention relates to the manner of combining the thin wooden side pieces with the metal bars and connections so as to afford a wider delivery space between such side-pieces at the location of the delivery end of the apron and the distributing-drum in removable spreaders adapted to be carried on running-gear of the limited standard width of tread. It is therefore immaterial at which end of said box the distributing-drum may be located.

Having described our invention, what we claim as new, and desire to secure by Letters Patent, is:

1. In a fertilizer distributer, in combination, wagon running-gear, a spreader-box supported thereon, and distributing-means located at the delivery-end of said box, said box being composed of side-pieces reinforced by longitudinal bars secured to their top and bottom edges, both said upper and lower bars on each side being extended beyond one end of said box, the upper bars being arched to provide clearance for a distributing-drum and the lower bars being arched to provide clearance for the pivoted wheels of the said running-gear to swing thereunder.

2. In a fertilizer distributer, in combination, wagon running-gear, a spreader-box mounted thereon, and a distributing-drum rotatably mounted in the forward end of said box, said box being composed of side-pieces whose lower edges are connected by transverse sills and reinforced by longitudinal bars secured to their upper edges, the said bars being extended beyond the forward ends of said side-pieces and arched to provide clearance thereunder for said distributing-drum.

3. In a fertilizer distributer, in combination, wagon running-gear, a spreader-box mounted thereon, and a distributing-drum rotatably mounted in the forward end of said box, said box being composed of side-pieces reinforced by longitudinal bars secured to their upper edges, said bars extending beyond the forward ends of said side-pieces and being offset upwardly to provide clearance for the said distributing-drum thereunder.

4. In a fertilizer distributer, in combination, wagon running-gear, a spreader-box mounted thereon, a distributing-drum rotatably mounted at the forward end of said box, said box being formed of side-pieces reinforced by longitudinal bars secured to their top and bottom edges, both said top and bottom bars on each side being extended beyond the forward end of said box, the upper bars being offset upwardly to provide clearance for said distributing-drum, and the bottom bars being offset upwardly to provide clearance for the pivoted wheels of said running-gear to swing thereunder.

Signed at Waterloo, Iowa, this 10th day of Sept., 1908.

EUGENE BUSWELL.
THOMAS CASCADEN, Jr.

Witnesses:
G. C. KENNEDY,
O. D. YOUNG.